United States Patent
Sledd et al.

(10) Patent No.: US 6,289,919 B1
(45) Date of Patent: Sep. 18, 2001

(54) PRESSURE REGULATING VALVE WITH INTEGRAL DAMPING

(75) Inventors: Mike Sledd, Vista; David Ripley, San Diego, both of CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/587,664

(22) Filed: Jun. 5, 2000

(51) Int. Cl.[7] .................................................. G05D 16/02
(52) U.S. Cl. ................... 137/115.03; 137/115.21; 251/51; 251/52
(58) Field of Search ................ 137/115.03, 115.21; 251/50, 51, 52

(56) References Cited

U.S. PATENT DOCUMENTS

| | | | |
|---|---|---|---|
| 1,809,419 | * 6/1931 | Muller | 251/52 |
| 2,033,396 | * 3/1936 | Perrine | 251/51 |
| 2,748,947 | * 6/1956 | Jay | 137/115.03 X |
| 2,767,726 | * 10/1956 | Feucht | 137/115.21 |
| 2,973,061 | 2/1961 | Rumsey . | |
| 3,074,428 | 1/1963 | Mancewicz . | |
| 3,338,263 | 8/1967 | Altmeppen et al. . | |
| 3,606,905 | 9/1971 | Fehler . | |
| 4,064,906 | 12/1977 | Berg . | |
| 4,161,189 | 7/1979 | Mueller, Jr. . | |
| 4,168,721 | 9/1979 | Mueller, Jr. . | |
| 5,232,013 | 8/1993 | Morris . | |
| 5,240,036 | 8/1993 | Morris . | |
| 5,261,450 | 11/1993 | Betts . | |
| 5,285,813 | 2/1994 | Quante et al. . | |
| 5,678,604 | 10/1997 | Plauborg et al. . | |

FOREIGN PATENT DOCUMENTS

456187 * 8/1913 (FR) ...................................... 251/52

* cited by examiner

*Primary Examiner*—Stephen M. Hepperle
(74) *Attorney, Agent, or Firm*—Wood, Phillips, VanSanten, Clark & Mortimer

(57) ABSTRACT

A valve (20B) is provided is provided for regulating the pressure differential between a high pressure side (16) and a low pressure side (18) of a fluid system component (14). The valve (20B) utilizes a damping washer (60) to restrict the flow of fluid from a valve bore (32) in response to translation of a valve spool (30) in the valve bore (32). The damping washer (60) includes an aperture (78) that is piloted on a valve stem (41) extending from the valve spool (30). The damping washing (60) is biased against an open end (66) of the valve bore (32) by a spring (62) engaged between the damping washer (60) and a spring seat (48) that is engaged with the valve stem (41). A separate spring (46) is provided to bias the valve spool (30) against the high pressure fluid acting on the valve spool (30).

10 Claims, 3 Drawing Sheets

PRESSURE REGULATING VALVE WITH INTEGRAL DAMPING

FIELD OF THE INVENTION

This invention relates to valves and more specifically, to delta pressure regulating valves.

BACKGROUND OF THE INVENTION

It is well known in the fluid power and control industry to utilize delta pressure regulating valves (hereinafter "ΔP valves") to control or regulate the pressure differential between a high pressure side and a low pressure side of a fluid system component such as, for example, a pump, a flow control valve, an accumulator, a heat exchanger, etc. One known application of such ΔP valves is shown in FIG. 1, which illustrates a typical arrangement for a fuel control system 10 for a gas turbine engine. The system 10 includes a fuel pump 12, a servo metering valve 14 having a high pressure side 16 and a low pressure side 18, a ΔP valve 20 for maintaining a constant pressure differential between the high and low pressure sides 16 and 18, and a bypass passage 22 for bypassing flow from the high pressure side 16 though the ΔP valve 20 to an inlet side 24 of the pump 12. The servo metering valve 14 will typically be designed to deliver a fuel flow rate to an engine that is linearly proportional to a command current signal from an electronic engine control (not shown). The constant differential pressure between the high and low pressure sides 16 and 18 provided by the ΔP valve 20 allows for the linear relationship to be maintained between the command current signal and the fluid flow rate delivered to the engine by the servo metering valve 14.

FIG. 2 shows a more detailed representation of at least one known type of ΔP valve 20A for use in a fluid system, such as the fuel control system 10 shown in FIG. 1. The ΔP valve 20A includes a cylindrical valve piston or spool 30 that translates within a cylindrical bore 32 formed in a sleeve 34, which is typically provided as a matched set with the valve spool 30. The sleeve 34 is part of a valve housing 35 that includes a high pressure port 36 that is connected to the high pressure side 16 of the servo valve 14, a low pressure port 38 that is connected to the low pressure side 18 of the servo valve 14, and a bypass control port 40 that is connected to the bypass passage 22 to direct a modulated fuel flow thereto from the high pressure port 36. A cylindrical valve stem 41 is connected to the valve spool 30 for translation therewith, and extends from the spool 30 through the bore opening 66 to outside of the bore 32. One end 42 of the valve spool 30 is acted on by the fuel pressure on the high pressure side 16 of the servo valve 14, and the other end 44 of the valve spool 30 is acted on by the fuel pressure on the low pressure side 18 of the servo valve 14. Thus, the valve spool 30 senses the pressure differential across the servo valve 14. A helical compression, delta pressure spring 46, acting through a spring retainer or seat 48 engaged with the valve stem 41, serves to bias the valve spool 30 toward a delta pressure set point (hereinafter "ΔP set point) where the force on the valve spool 30 created by the high pressure acting on the end 42 is balanced by the force of the spring 46 and the low pressure acting on the end 44 and the stem 41. An adjustment screw or spacers (not shown) may be used to set the preload of the spring 46 and, thereby, the ΔP set point.

The valve spool 30 modulates the pressure differential by varying a metering orifice or flow control area 52 between the high pressure port 36 and the bypass port 40 to modulate a fuel flow to the bypass flow passage 22. More specifically, if the valve spool 30 senses excessive delta pressure, the valve spool 30 will be forced toward the low pressure port 38, compressing the delta pressure spring 46 and enlarging the flow control area 52 to the bypass flow port 40. This increases the force of the spring 46 and decreases the pressure on the high pressure side 16, thereby restoring the desired ΔP set point. Conversely, if the valve spool 22 senses insufficient delta pressure, the valve spool will move toward the high pressure port 36, decompressing the delta pressure spring 46 and reducing the flow control area 52 to the bypass flow port 40. This decreases the force of the spring 46 and increases the pressure on the high pressure side, thereby restoring the desired ΔP set point.

It is known for fluid systems, such as the fuel control system 10, to become unstable when there is insufficient damping in the system and if one or more of the components, such as the valve 20A, is excited at a resonate frequency. While various methods and devices exist to increase the damping of fluid systems and components, they can often add excess cost and/or be difficult to incorporate due to pre-existing constraints in envelope size and hardware configuration. Accordingly, there is always room for improvement.

SUMMARY OF THE INVENTION

It is the principal object of this invention to provide a new and improved ΔP valve with integral damping. It is another object of the invention to provide such a valve for a fuel control system, such a the system 10.

In accordance with one form of the invention, a valve is provided for regulating the pressure differential between a high pressure side and a low pressure side of a fluid system component device. The valve includes a housing, a valve spool, a valve stem, a spring seat, a damping washer, a first spring, and a second spring. The housing includes a surface, a first bore opening in the surface, a bore extending along an axis between the first bore opening and a second bore opening, and a flow bypass port located in a wall of the bore between the first and second openings. The first bore opening is to receive low pressure fluid from the low pressure side, and the second bore opening is to receive high pressure fluid from the high pressure side. The valve spool is slidably received in the bore for translation along the axis to modulate a fluid flow area between the second bore opening and the flow bypass port. The valve spool includes first and second ends, with the first end being acted on by fluid pressure from the first bore opening and the second end being acted on by fluid pressure from the second bore opening. The valve stem is connected to the valve spool for translation therewith, and extends from the first end through the first bore opening to outside of the bore. The spring seat is engaged with the valve stem. The damping washer has first and second faces and an aperture extending through the washer between the first and second faces. The damping washer is piloted on the valve stem by the aperture and located between the spring seat and the surface. The valve stem is slidably received in the aperture to allow relative movement between the valve stem and the damping washer. The first spring is engaged against the spring seat to bias the valve spool against the fluid pressure acting on the second end of the valve spool. The second spring is engaged between the spring seat and the first face of the damping washer to bias the second face of the damping washer against the surface.

Other objects and advantages will become apparent from the following specification taken in connection with the accompanying drawings.

DETAILED DESCRIPTION OF THE DRAWINGS

DETAILED DESCRIPTION OF THE PREFERRED EMBODIMENTS

Figure 1:
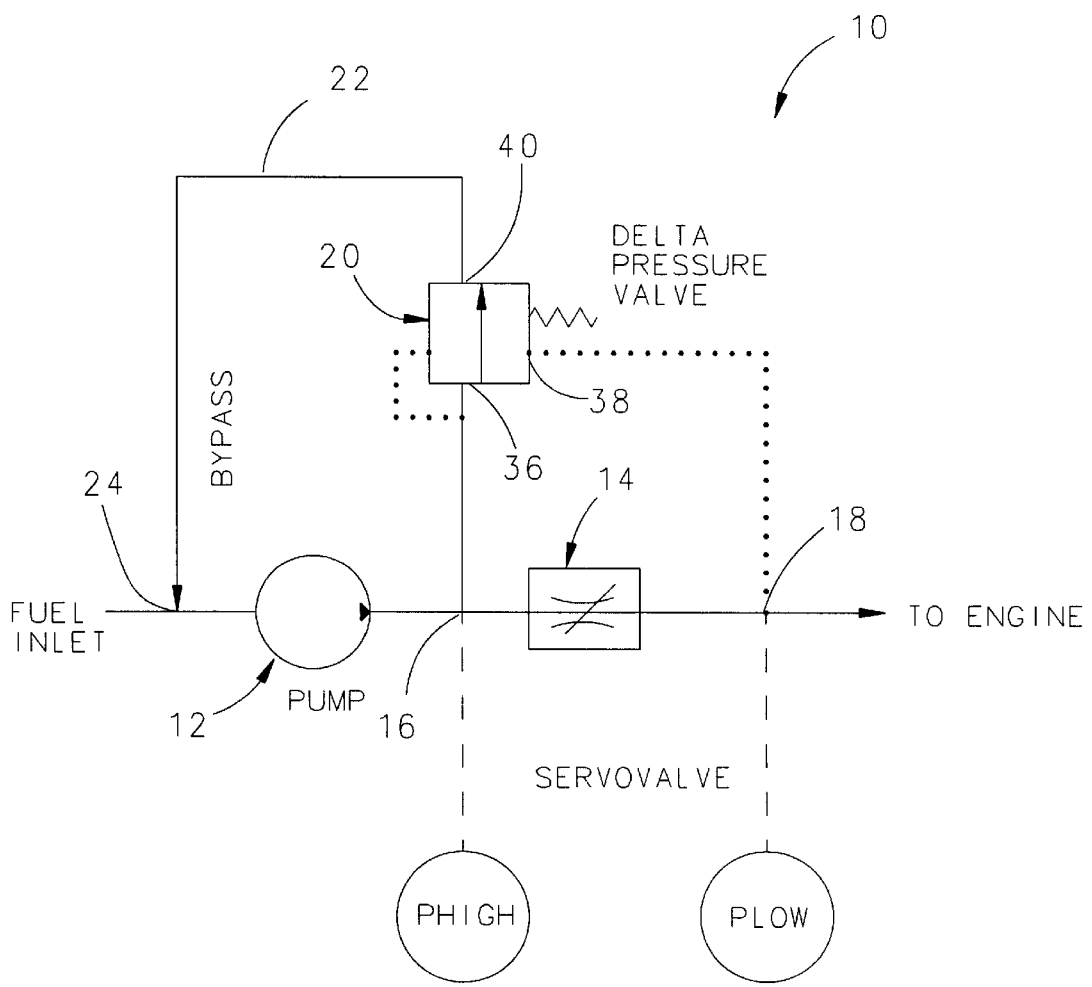
FIG. 1 is a diagrammatic representation of a fuel control system for a gas turbine engine.
Figure 2:
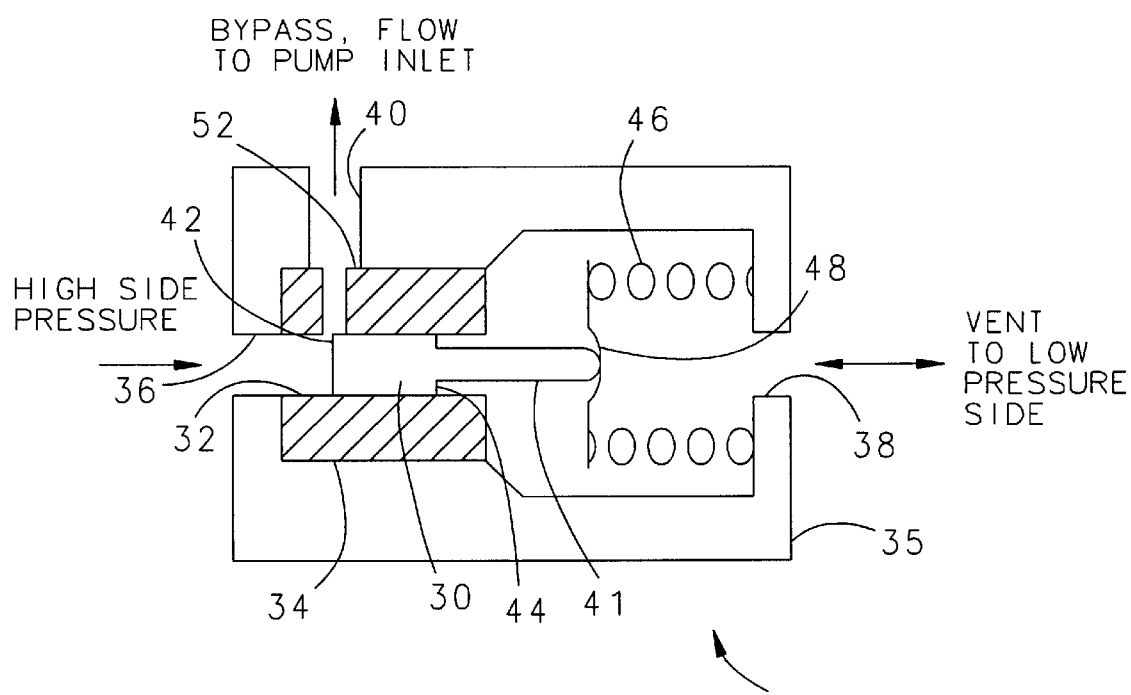
FIG. 2 is a diagrammatic representation of a known $\Delta P$ valve.

The invention is illustrated and described herein in connection with a $\Delta P$ valve 20B as used in a fuel control system, such as the system 10 shown in FIG. 1. However, it should be understood that the invention will find utility in many other forms, and that no limitations to use with a fuel control system are intended except for as expressly recited in the claims.

Figure 3:
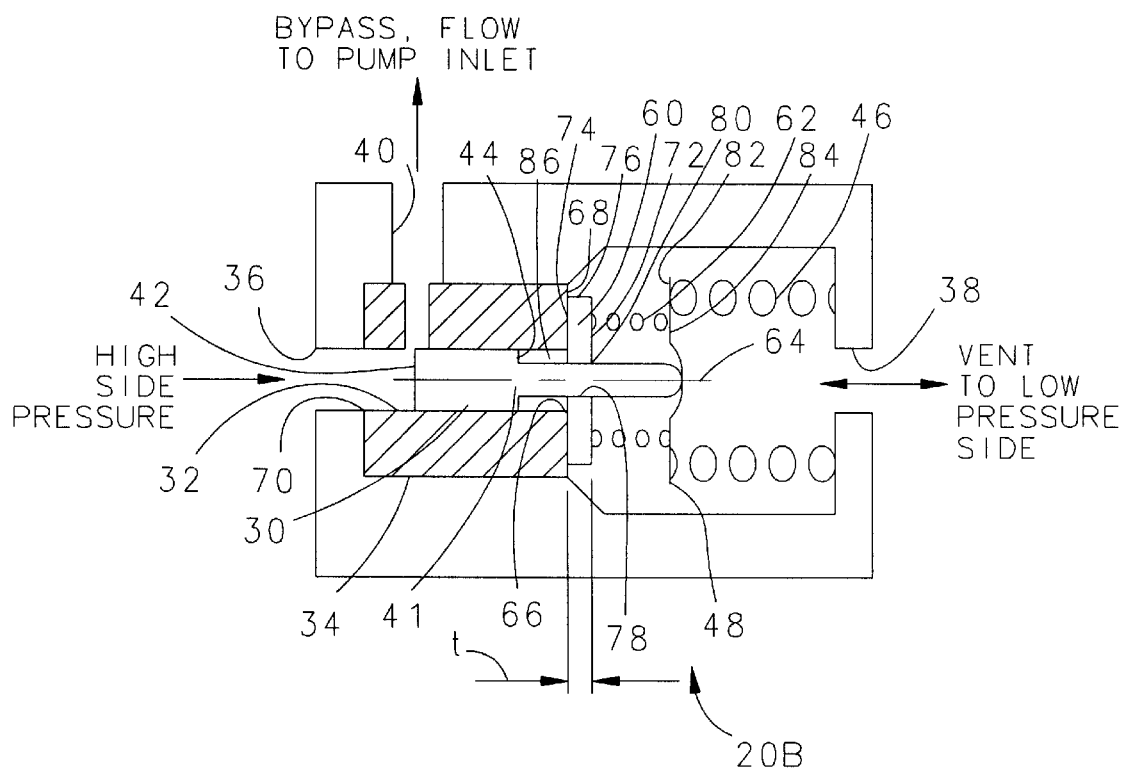
FIG. 3 is a diagrammatic representation of a $\Delta P$ valve embodying the present invention.

FIG. 3 shows the $\Delta P$ valve 20B embodying the present invention. The $\Delta P$ valve 20B is essentially identical in form and operation to the $\Delta P$ valve 20A, except for the addition of a damping member in the form of a damping washer 60 and a helical compression spring 62 that is used to position the damping washer 60. Accordingly, the reference numbers used in describing the $\Delta P$ valve 20A are used to identify the common features and components of the $\Delta P$ valve 20B.

The $\Delta P$ valve 20B includes the cylindrical valve piston or spool 30 that translates within the cylindrical bore 32 in the sleeve 34. The sleeve 34 is part of the valve housing 35 that includes the high pressure port 36 that is connected to the high pressure side 16, the low pressure port 38 that is connected to the low pressure side 18, and the bypass control port 40 that is connected to the bypass passage 22 to direct a modulated fuel flow thereto from the high pressure port 36. The bore 32 extends along an axis 64 from a first bore opening 66 in a surface 68 of the sleeve 34 to a second bore opening 70 at an opposite end of the sleeve 34. Preferably, the bore 32 and the axis 64 are at least nominally perpendicular to the surface 68.

The damping washer 60 has first and second nominally parallel faces 72 and 74 spaced by a thickness t, and is preferably ring shaped when viewed along the axis 64, with a cylindrical outer periphery 76 and a centered aperture in the form of a cylindrical bore 78 extending between the faces 72 and 74. The bore 78 is piloted on the valve stem 41 with a loose or sliding fit that allows translation of the valve spool 30 and stem 41 relative to the damping washer 60. Preferably, the damping washer 60 covers the bore opening 66 except for a flow area 80 defined between the bore 78 and the valve stem 41.

The spring 62 is engaged between the first face 72 of the damping washer 60 and a surface 82 of the spring seat 48 that is opposite from a surface 84 of the spring seat 48 that is engaged by the delta pressure spring 46. The spring 62 biases the second face 74 of the damping washer against the surface 68 adjacent the bore opening 66. The bias force of the spring 62 and the piloting of the bore 78 on the valve stem 41 serve to maintain the damping washer 60 in a desired position within the valve 20B.

As in the valve 20A, the end 42 of the valve spool 30 in the valve 20B is acted on by the fuel pressure on the high pressure side 16 of the servo valve 14, and the other end 44 of the valve spool 30 and the valve stem 41 are acted on by the fuel pressure on the low pressure side 18 of the servo valve 14. Thus, the valve spool 30 senses the pressure differential across the servo valve 14. The delta pressure spring 46, acting through the spring seat 48 engaged with the valve stem 41, serves to bias the valve spool 30 toward the $\Delta P$ set point where the forces on the valve spool 30 created by the high pressure acting on the end 42 and the spring 62 acting on the spring seat 48 are balanced by the force of the spring 46 and the low pressure acting on the end 44 and the stem 41. As with the valve 20A, an adjustment screw or spacers may be used to set the preload of the spring 46 and, thereby, the $\Delta P$ set point. It is preferred that the preload of the spring 62 be less than the preload of the spring 46, and, generally, that the spring rate of the spring 62 be less than the spring rate of the spring 46. Further, it is preferred that the preload and spring rate of the spring 62 be light enough so that inadvertent contact between the stem 41 and the bore 78 does not create unacceptable side loads or frictional drag on the valve spool 30 that will appreciably alter the performance of the valve 20B. It is quite possible that in some applications the preload and spring rate of the spring 60 may be negligible in comparison to the preload and spring rate of the spring 46.

As with the valve 20A, the valve spool 30 in the valve 20B modulates the pressure differential by varying the flow control area 52 between the high pressure port 36 and the bypass port 40 to modulate the fuel flow to the bypass flow passage 22. When the valve spool 30 senses excessive delta pressure, the valve spool 30 is forced toward the low pressure port 38, thereby compressing the delta pressure spring 46, decompressing the spring 62, and enlarging the flow control area 52 to the bypass flow port 40. This increases the force of the spring 46, decreases the force of the spring 62, and decreases the high pressure on the high pressure side 16, thereby restoring the desired $\Delta P$ set point. Conversely, when the valve spool 22 senses insufficient delta pressure, the valve spool is forced toward the high pressure port 36, thereby decompressing the delta pressure spring 46, compressing the spring 62, and reducing the flow control area 52 to the bypass flow port 40. This decreases the force of the spring 46, increases the force of the spring 62, and increases the pressure on the high pressure side, thereby restoring the desired $\Delta P$ set point.

Unlike the valve 20A, the translations of the valve spool 30 in the valve 20B are damped by the damping washer 60. More specifically, as the valve spool 30 translates in response to changes in pressure on the high and low pressure sides 16 and 18, fuel must be forced through the area 80 to accommodate the volume changes in a fluid damping section 86 between the end 44 of the valve spool and the second face 74 of the damping washer 60. This creates a back pressure across the damping washer 60 that resists the translation of the valve spool 30, thereby slowing the translation. More specifically, when the valve spool 30 translates toward the high pressure port 36 in response to insufficient delta pressure, the pressure in the fluid damping section 86 acting on the end 44 is reduced in comparison to the pressure at the low pressure port 38, thereby reducing the force translating the valve spool 30 and slowing the translation. Conversely, when the valve spool translates toward the low pressure port 38 in response to an excessive delta pressure, the pressure in the fluid damping section 86 increases with respect to the pressure from the low pressure port 38, thereby increasing the resistance force to the translation of the valve spool 30 and slowing the translation.

When the valve spool 30 translates toward the high pressure port 36 in response to insufficient delta pressure, the back pressure across the damping washer 60 combines with the bias force of the spring 62 thereby increasing the force engaging the second surface 74 of the damping washer 30 against the surface 68. Conversely, when the valve translates toward the low pressure port 38 in response to excessive delta pressure, the back pressure across the damping washer 60 acts against the bias force of the spring 62 thereby reducing the amount of force engaging the second surface against the surface 68. In this case, if the force of the back pressure exceeds the bias force of the spring 62, the damping washer 60 will lift off of the surface 68, thereby creating an additional flow area between the face 74 and the surface 68 and reducing the damping effect of the damping washer 60. Thus, by selecting an appropriately light preload and/or spring rate, it is possible for the valve spool 30 to experience one damping effect or coefficient when it translates in response to insufficient delta pressure and a lower damping effect or coefficient when it translates in response to excessive delta pressure.

The appropriate amount of damping will vary from application to application, and can be easily set by providing the appropriate flow area 80 and thickness t for the damping washer 60. If, for a particular application it is undesirable to have different damping effects in each direction of translation, the spring 62 can be designed with sufficient preload and/or spring rate to prevent the damping washer 60 from lifting away from the surface 68 under most, or all, of the anticipated operating conditions for the ΔP valve 20B.

While a diagrammatic illustration of a preferred embodiment in the form of the ΔP valve 20B has been shown, it will be appreciated by those skilled in the art that according to the invention a number of modifications to the illustrated embodiment are possible, and may be desirable in some applications. For example, while it is preferred that the surface 68 and the faces 72 and 74 be nominally flat and parallel, it may be desirable in some applications for non-flat surface shapes to be utilized for select ones, or all, of these features. As another example, while it is preferred that the damping washer 60 be ring shaped, it may be desirable in some applications for the damping washer 60 to have other shapes. As yet another example, while it is preferred that the springs 46 and 62 be helical compression springs, it may be desirable in some applications for either or both of the springs 46 and 42 to be provided in other suitable forms, such as for example, belleville springs or conical springs. As a further example, while the spring seat 48 is shown as being engaged with an end of the valve stem 41, it will be appreciated by those skilled in the art that there are a number of suitable ways to engage a spring seat with a stem that may be preferred for some applications. By way of further example, while a relatively simple valve spool 30 is illustrated with ends 42 and 44 having nominally equal diameters, it may be desirable in some applications to provide a more complex valve spool 30 with ends 42 and 44 that do not have nominally equal diameters for translation in a bore 32 that also has stepped diameters to conform to the ends 42 and 44. As yet another example, while the sleeve 34 has been illustrated as a separate piece that has been integrated with the housing 35, it may be advantageous in some applications for the sleeve 34 to be a unitary part of the housing 35, and further for the housing 35 to be an integrated housing that holds other fluid system components.

It should be appreciated that the use of the damping washer 60 and the spring 62 can provide a relatively low cost solution for providing damping in a fluid system. Further, it should appreciated that the damping washer 60 and spring 62 may be incorporated in many valves without requiring substantial modifications to the valves. Further, it should be appreciated that the damping washer 60 and spring 62 can be self-locating, and therefore, may eliminate the need to produce special locating features within a valve.

What is claimed is:

1. A valve for regulating the pressure differential between a high pressure side and a low pressure side of a fluid system component, the valve comprising:
    a housing including a surface, a first bore opening in said surface, a bore extending along an axis between the first bore opening and a second bore opening, and a flow bypass port located in a wall of the bore between the first and second openings, the first bore opening to receive low pressure fluid from said low pressure side, the second bore opening to receive high pressure fluid from said high pressure side;
    a valve spool slidably received in said bore for translation along said axis to modulate a fluid flow area between the second bore opening and the flow bypass port, the valve spool including first and second ends, the first end acted on by fluid pressure from the first bore opening, the second end acted on by fluid pressure from the second bore opening;
    a valve stem connected to the valve spool for translation therewith, the valve stem extends from the first end through the first bore opening to outside of the bore;
    a spring seat engaged with the valve stem;
    a damping washer having first and second faces and an aperture extending through the washer between the first and second faces, the damping washer being piloted on the valve stem by the aperture and located between the spring seat and the surface, the valve stem being slidably received in said aperture to allow relative movement between the valve stem and the damping washer;
    a first spring engaged against the spring seat to bias the valve spool against the fluid pressure acting on the second end of the valve spool; and
    a second spring engaged between the spring seat and the first face of the damping washer to bias the second face of the damping washer against the surface.

2. The valve of claim 1 wherein the damping washer completely covers the first bore opening except for an open area between the aperture and the valve stem.

3. The valve of claim 1 wherein the damping washer is ring shaped with a nominally cylindrical outer periphery and the aperture being nominally cylindrical.

4. The valve of claim 1 wherein said first and second springs are helical compression springs, and the first spring is engaged between the spring seat and a second surface of the housing.

5. The valve of claim 1 wherein said first and second springs engage first and second opposite sides, respectively, of the spring seat.

6. The valve of claim 1 wherein the aperture is a nominally cylindrical bore that is nominally centered in the damping washer.

7. The valve of claim 1 wherein the surface of the housing and the second face of the damping washer are nominally flat.

8. The valve of claim 1 wherein the axis and the surface are nominally perpendicular.

9. The valve of claim 1 wherein the wall of the bore is nominally cylindrical, said valve spool has a nominally cylindrical outer surface having a sliding fit with the cylindrical surface of the bore, and said bore openings are nominally circular.

10. The valve of claim 9 wherein the first and second ends have nominally equal outer diameters.

* * * * *